(12) United States Patent
Gierl et al.

(10) Patent No.: US 7,738,609 B2
(45) Date of Patent: Jun. 15, 2010

(54) MULTIPATH COMPENSATION FOR SIGNAL RECEIVERS

(75) Inventors: Stefan Gierl, Karlsruhe (DE); Joachim Wietzke, Karlsruhe (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1515 days.

(21) Appl. No.: 11/063,713

(22) Filed: Feb. 22, 2005

(65) Prior Publication Data
US 2005/0276365 A1 Dec. 15, 2005

(30) Foreign Application Priority Data
Feb. 23, 2004 (EP) .................................. 04004065

(51) Int. Cl.
*H04B 1/10* (2006.01)
(52) U.S. Cl. ........................ 375/349; 375/316; 375/346; 455/133; 370/225; 370/228
(58) Field of Classification Search ...................... 455/7, 455/11.1, 12.1, 13.3, 63.1, 63.3, 65, 130, 455/132, 134–135, 199.1, 275, 277.1–277.2; 375/275, 271–272, 259, 316, 322, 334, 335, 375/346–347, 349, 354; 370/216–228
See application file for complete search history.

(56) References Cited

U.S. PATENT DOCUMENTS 5,621,770 A    4/1997  Zastera
5,852,630 A *  12/1998 Langberg et al. ............ 375/219
6,188,447 B1 * 2/2001  Rudolph et al. ............. 348/729
6,546,026 B1 * 4/2003  Goeddel ...................... 370/513
6,654,824 B1 * 11/2003 Vila et al. ...................... 710/60
2001/0003088 A1* 6/2001  Ogino et al. ................ 455/13.4
2002/0094048 A1   7/2002  Simmons et al.
2002/0176432 A1* 11/2002 Courtney et al. ............ 370/415

FOREIGN PATENT DOCUMENTS

WO    WO 01/50648 A1   7/2001
WO    WO 02/15412 A2   2/2002

* cited by examiner

*Primary Examiner*—Shuwang Liu
*Assistant Examiner*—James M Perez
(74) *Attorney, Agent, or Firm*—The Eclipse Group LLP

(57) ABSTRACT

This invention provides a signal synchronizer that is capable of minimizing the effects of multi-path reception. The signal synchronizer provides signal samples from a first signal source and a second signal source for generating an output signal. The signal synchronizer includes a memory for storing signal samples obtained from a first signal source and for storing signal samples obtained from a second signal source. Circuitry in the synchronizer determines a signal transit time difference between the first signal source and the second signal source. A readout controller then determines a memory offset from the signal transit time difference. The memory offset specifies a location in the memory from which to begin reading the signal samples obtained from the second signal source.

38 Claims, 3 Drawing Sheets

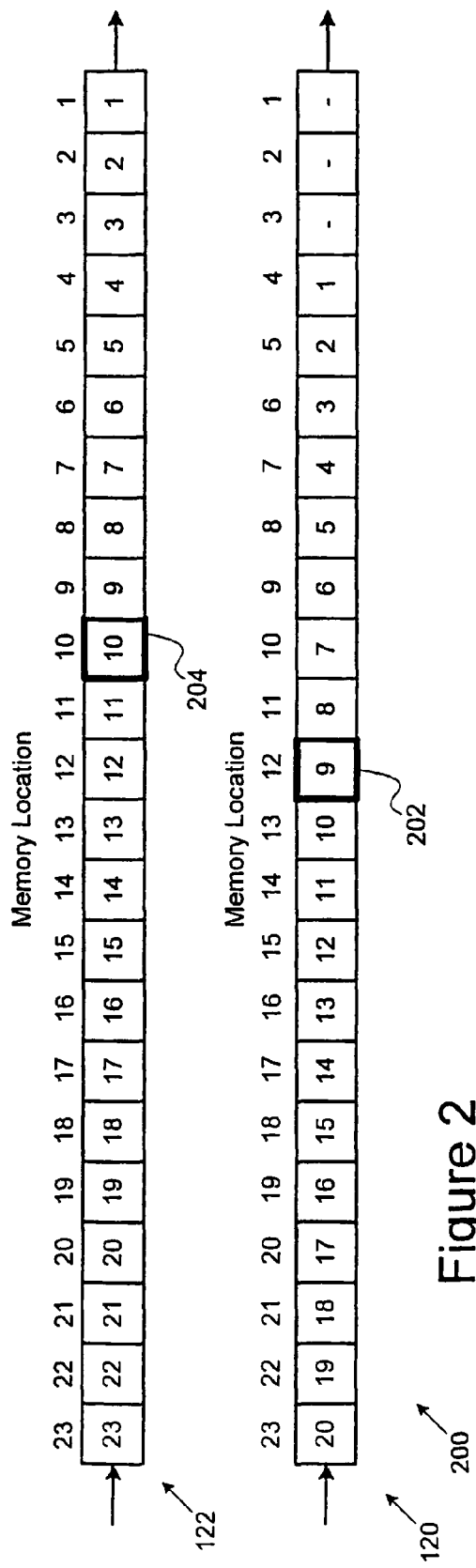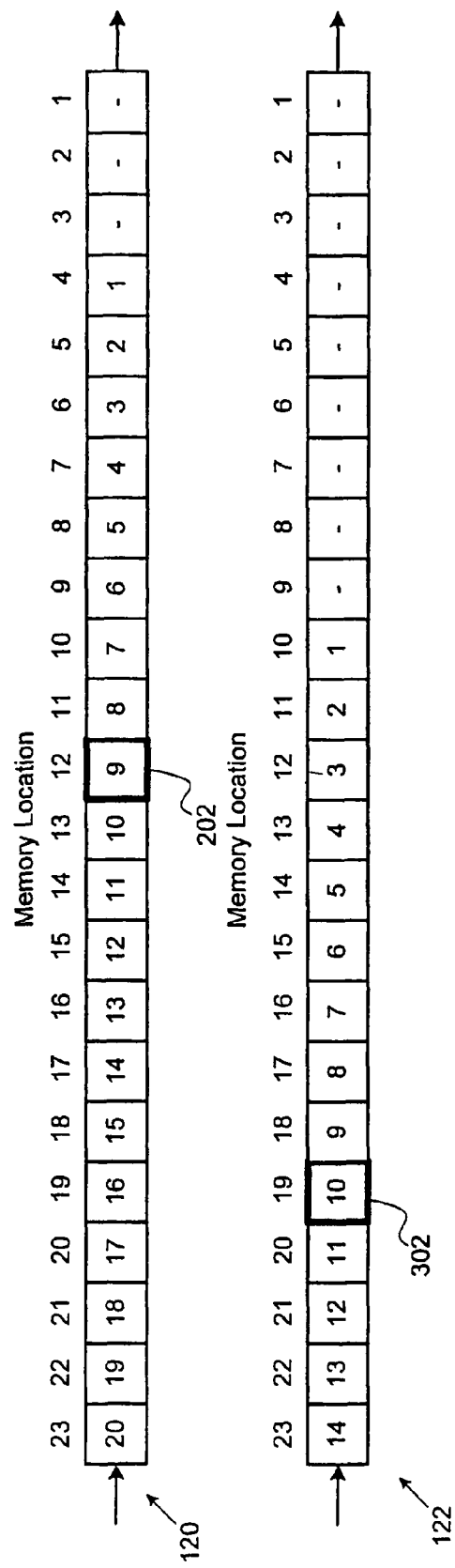

MULTIPATH COMPENSATION FOR SIGNAL RECEIVERS

CROSS REFERENCE TO RELATED APPLICATIONS

This application claims priority to European patent application 04004065.1 filed on Feb. 23, 2004, which is incorporated into this application in its entirety.

BACKGROUND OF THE INVENTION

1. Field of the Invention

This invention relates generally to the field of communications and signal processing. In particular, the invention relates to a technique for eliminating artifacts in an output signal produced, for example, by systems employing multipath reception techniques.

2. Related Art

Multipath reception relates to obtaining and processing radio signals from one of multiple transmission paths or channels. Generally, the term multipath reception is applied to systems that incorporate multiple antennas (for spatial or antenna diversity) and systems that receive signals on multiple frequency channels (for frequency diversity).

In motor vehicles the radio system may employ antenna diversity in the form of multiple spatially separated antennas. For example, one antenna may be built into a window, while another antenna may rise from an exterior surface of the motor vehicle. When the antenna diversity radio system operates, a receiver system selects one of the antennas as the source of radio signals for processing based on predefined criteria. For example, the criteria may be received signal strength, interference or noise level, signal to noise ratio, or other signal quality criteria. In other words, the receiver system generally selects the best signal available for processing.

Frequency diversity systems also attempt to receive and process the highest quality signal. However, these systems generally include multiple radio receivers; one radio receiver functions as the operating receiver, and another receiver functions as a search and check receiver. The operating receiver stays tuned to the frequency of interest to receive and process the received radio signal. On the other hand, the search and check receiver searches for alternate reception frequencies that offer higher signal quality.

If the check receiver finds an alternate reception frequency, the operating receiver tunes to the alternate reception frequency and begins processing the received signal. Alternatively, the check receiver and the operating receiver may switch roles. In other words, the check receiver remains tuned to the alternate reception frequency and assumes the role of the operating receiver. The prior operating receiver then assumes the role of the check receiver and begins searching for alternative reception frequencies offering higher signal quality. In automobile radios, the operating receiver is sometimes referred to as the "audio receiver," while the check receiver is sometimes referred to as the "background receiver."

In the past, a change to a new radio signal source often introduced noticeable artifacts into the output signal produced by the radio system. One source of artifacts was the significant variation in propagation delay experienced by radio signals in reaching the radio system, either at different antennas, or at a different frequency. Due to the variation in propagation delay, there was no expectation that the new signal source would be aligned in time with the previously received and processed signal source. Thus, the switch to a new antenna or a new frequency resulted in artifacts caused by repetition or omission of information. When the output signal was a music program, for example, the artifacts detracted from the perceived quality of the program. Therefore, there is a need for additional improvements in the systems used for multipath reception that do not suffer from the shortcomings set forth above.

SUMMARY

This invention provides a signal synchronizer that minimizes the effects of multi-path reception. The signal synchronizer provides signal samples for generating an output signal (e.g., a music program). The signal synchronizer includes a memory for storing signal samples obtained from a first signal source and for storing signal samples obtained from a second signal source. Circuitry in the synchronizer determines a signal transit time difference between the first signal source and the second signal source. A readout controller then determines a memory offset from the signal transit time difference. The memory offset specifies a location in the memory from which to begin reading the signal samples obtained from the second signal source and thereby eliminates at least a portion of signal transit time effects on the output signal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

FIG. 2 is a block diagram illustrating various memory location in the signal front-end shown in FIG. 1 that store signal samples obtained from a first signal source and a second signal source.

FIG. 3 is a block diagram illustrating memory location in the signal front-end shown in FIG. 1 that store signal samples obtained from a first signal source and a second signal source.

DETAILED DESCRIPTION

Figure 1:
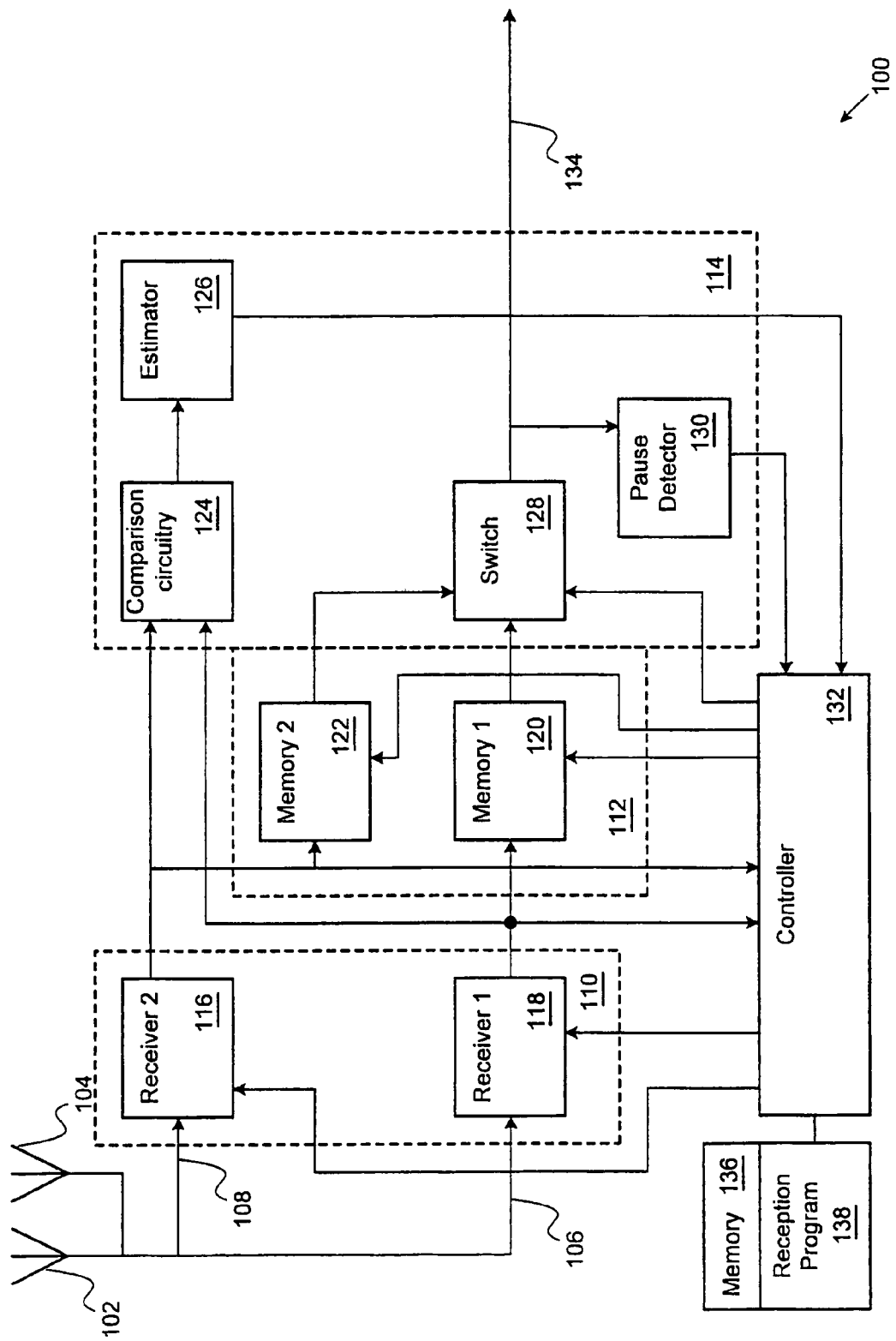
FIG. 1 is a block diagram illustrates a multi-path signal front-end that helps to minimizes artifacts caused in an output signal by unequal signal transit times.

In FIG. 1, a multi-path signal front-end 100 is coupled to a first antenna 102 and a second antenna 104 through the first and second antenna inputs 106, 108. The front-end 100 includes a receiver section 110, a memory section 112, and support circuitry 114. A controller 132 coordinates the operation of the front-end 100. The receiver section 110 includes the first receiver 116 and the second receiver 118, while the memory section 112 includes the first shift register memory 120 and the second shift register memory 122. The support circuitry 114 includes the comparison circuitry 124, the estimator circuitry 126 and the switch 128 and the pause detector 130. The output connection 134 provides selected signal samples to additional processing blocks (not shown) in order to produce an output signal (e.g., a music program).

The controller 132 connects to the general-purpose memory 136 that may store a reception program 138. The reception program 138 coordinates the operation of the front-end 100 and works with the controller 132 to help minimize artifacts caused in an output signal by unequal signal transit times. The reception program 138 may also include instructions that will lead the controller 132 to employ the circuitry set forth above to determine a signal transit time difference between two signal sources and to output signal samples to compensate for that signal transit time difference when switching signal sources.

The receivers generally include mixers, demodulators and digitizers that produce signal samples from signal sources received on the antennas 102 and 104. The signal samples obtained from the first receiver 116 are shifted through the first shift register memory 120, while the signal samples obtained from the second receiver 118 are shifted through the second shift register memory 122.

However, two physically separate receivers are not necessarily needed. Rather, a single receiver that demodulates multiple channels in bulk may be used to obtain signal samples from multiple signal sources. Similarly, the memory section need not employ shift registers, but may instead use general purpose DRAM or other well known memory types and their derivatives interoperating with the controller 132.

More generally, one skilled in the art will appreciate that all or part of the memory system may be stored on or read from other tangible media. For example, secondary storage devices such as hard disks, floppy disks, and CD-ROMS; or other forms of ROM or RAM either currently known or later developed derivatives. Although specific components of the front-end 100 are described, one skilled in the art will appreciate that a front-end suitable for use wit methods, systems, and articles of manufacture consistent with the invention may contain additional or different components. For example, the controller 132 may be a microprocessor, microcontroller, application specific integrated circuit ("ASIC"), discrete or a combination of other types of circuits acting as a central processing unit. In addition, the memories may be RAM, DRAM, SDRAM, or any other type of read/writeable memory.

In one embodiment, one receiver may be the operating receiver, while the other receiver may be a search receiver. The operating receiver may act as the receiver that tunes to the program of interest and generates signal samples for that program. The search receiver may act as the receiver that scans alternate reception frequencies for the program of interest and that provides representative signal samples for signal quality metric analysis. If the alternate reception frequency provides better signal quality, then the operating receiver changes to the alternate reception frequency for continued reception of the program, while the search receiver continues to scan alternate reception frequencies. Signal samples from the search receiver are used, as described in more detail below, to generate the output signal until the operating receiver has completed its frequency change.

In another embodiment, the receivers may switch roles between the search receiver and the operating receiver. Thus, when an alternate reception frequency with better signal quality is located, the search receiver that found the alternate reception frequency stays tuned to that frequency and becomes the operating receiver. The prior operating receiver then becomes the search receiver.

FIG. 1 also illustrates that the signal samples present on the output connection 134 depend on the operation of the support circuitry 114. In particular, the switch 128 allows signal samples to be taken from either the first signal source or the second signal source onto the output connection 134. In general, the output connection 134 carries signal samples from the signal source that is experiencing the best signal quality. However, when an alternate reception frequency is found that offers better signal quality, the controller changes the switch 128 so that signal samples from the alternate signal source are placed on the output connection 134.

Although the switch 128 is illustrated as a separate element, it may be implemented in many ways. For example, the switch may be a mulitplexer, or the output of a general-purpose data bus on which the controller 132 places the appropriate signal samples for generation of the output signal.

In doing so, the controller 132 may use the comparison circuitry 124 and estimator circuitry 126 to determine a signal transit time differential (e.g., in terms of a number of signal samples or in terms of units of time) based on the signal samples obtained from the first and second signal sources. For example, the comparison circuitry 124 may be a cross-correlator that correlates the contents of the shift registers 120 and 122. The estimator circuitry 126 may be comparison circuitry that identifies at what shift value the correlation peak exists. Thus, as the comparison circuitry 124 outputs correlation values, the estimator circuitry 126 may search for the correlation peak in the correlation values. The shift value that produces the correlation peak approximately gives the signal transit time. As also shown in FIG. 2, the shift registers 120, 122, support circuitry 114, and controller 132 may act as a signal synchronizer.

FIG. 2 is a block diagram illustrating a diagram 200 of the shift registers 120 and 122. As shown, the shift registers have 23 storage locations, but more or less storage locations may be provided. The numbers in each storage location indicate sequentially stored signal samples of a program of interest obtained by the first receiver 116, in the case of the first shift register 120, and by the second receiver 118, in the case of the second shift register 122. The operating point for the first shift register 120 may be the memory element 202, while the operating point for the second shift register 122 may be the memory element 204. Note that because of unequal signal transit times between the first signal source and the second signal source, the signal samples are not obtained and stored in corresponding locations in each shift register 120, 122.

Signal samples are read out of the shift registers 120 and 122 at the preset operating point in each shift register. As signal samples shift through the shift registers, different signal samples appear at the operating point, and different signal samples are thereby transferred to the output connection 134. The controller 132 may set the operating point by asserting control signals to the shift registers, or by directly retrieving signal samples from memory and placing them on the output connection 134. For example, the operating point for the first shift register, as shown in FIG. 2, is memory location 12, where the ninth signal sample obtained from the first signal source may be currently stored. The operating point may be set to any memory location in each shift register. However, setting the operating point to a central memory location or stage is advantageous. In general, in a shift register of length L, the operating point may be set to (Ta*L)/2, wherein Ta is the time interval between signal samples.

FIG. 2 also shows an example where the second signal source leads (or arrives before) the first signal source by as many as three sample periods. Thus, additional signal samples of the second signal source are present in the second shift register 122 and the signal samples that are common to both the first shift register 120 and the second shift register 122 are advanced in position in the second shift register 122. If the front-end 100 were to directly switch to the second signal source and read signal samples from the second shift register 122 at the same operating point (location 12) for the first shift register 120, the front-end would omit signal samples 10 and 11. The result may be the introduction of artifacts into the output signal because the next signal sample should be sample 10, not sample 12. Because the second signal source is arriving 3 sample periods earlier, signal sample 10 is present at memory location 10 in the second shift register 122.

FIG. 3 is a block diagram illustrating a similar situation as depicted in FIG. 2, except that the second signal source arrives seven samples in time behind the first signal source. Thus, if the front-end 100 were to switch directly to the second signal source at operating point 12, the output signal would repeat signal samples 3, 4, 5, 6, 7, 8, and 9. In other words, the output signal would create duplicated information artifacts in the output signal. Instead, the operating point for the second shift register is offset from the operating point 12. More specifically, the operating point 302 for the second shift register is offset seven locations to memory location 19 in the second shift register 122.

The front-end 100 helps eliminate such artifacts that would otherwise arise in the output signal. To that end, the front-end 100 determines the transit time difference between the first and second signal sources. In one embodiment, the front-end 100 uses the comparison circuitry 124 and estimator circuitry 126 to perform a cross-correlation on the signal samples. The peak in the correlation will occur when the two sets of signal samples are most closely matched.

In FIG. 2, the comparison circuitry 124 and estimator circuitry 126 will find that the maximum of the cross correlation function occurs at a shift of three sampling periods. Thus, the controller 132, when switching to the second signal source, synchronizes to the new signal source by setting the operating point for the second shift register to memory location 10, where the next signal sample (sample 10) is stored for the program of interest. As a result, the output signal does not repeat signal samples 10 and 11, and no artifacts are created by omitting information.

Similarly, with regard to FIG. 3 and a late signal, the comparison circuitry 124 and estimator circuitry 126 will find that the maximum of the cross correlation function occurs at a shift of seven sampling periods. Thus, the controller 132, when switching to the second signal source, synchronizes to the new signal source by setting the operating point for the second shift register to memory location 19, where the next signal sample (sample 10) is stored for the program of interest. As a result, the output signal does not repeat signal samples 10 and 11, and no artifacts are created by repeating information.

When a shift register operating point has been initially established away from a center stage of the shift register, the controller 132 may move the operating point back toward the center to assist with correlation and further synchronizations when the source signal is again switched. In order to move the operating point, the controller 132 may insert or remove (or discard without storing) signal samples in the shift registers. For example, referring back to FIG. 2, and assuming that the operating point is memory location 10 in the second shift register 122, the controller 132 may move the operating point back to memory location 12 by removing two signal samples from the second shift register 122. The controller 132 may remove silence signal samples, for example, or discard without storing two silence signal samples, so that the operating point moves back to memory location 10.

The pause detector 130 may be used to detect silence samples. For example, the pause detector 130 may incorporate comparison circuitry that compares a signal sample to a predetermined silence threshold to determine if the signal sample falls below the threshold. The pause detector 130 provides the result of the comparison to the controller 132.

Similarly, assuming that the operating point is memory location 19 in the second shift register 122 as shown in FIG. 3, the controller 132 may move the operating point back to memory location 12 by inserting seven signal samples into the second shift register 122. The controller 132 may insert silence signal samples, for example, detected by the pause detector 130.

The controller 132 may be implemented as discrete circuitry, or as a general-purpose microcontroller executing instructions from a memory. The correlation, estimation, and pause detection functions may thus be implemented as software functions (performed by the controller 132), as separate hardware elements, or as circuit blocks in one or more integrated circuit packages. Furthermore, the shift registers 120, 122 may be replaced with other types of memories, such as a single block of DRAM, with signal sample indexing performed by the controller 132. Also note that the signal sources may be received by one antenna (where the signal sources are separated in frequency), multiple antennas (where the signal sources are separated spatially), or by both. One, two, or more than two receivers may be provided to receive the signal samples.

Figure 4:
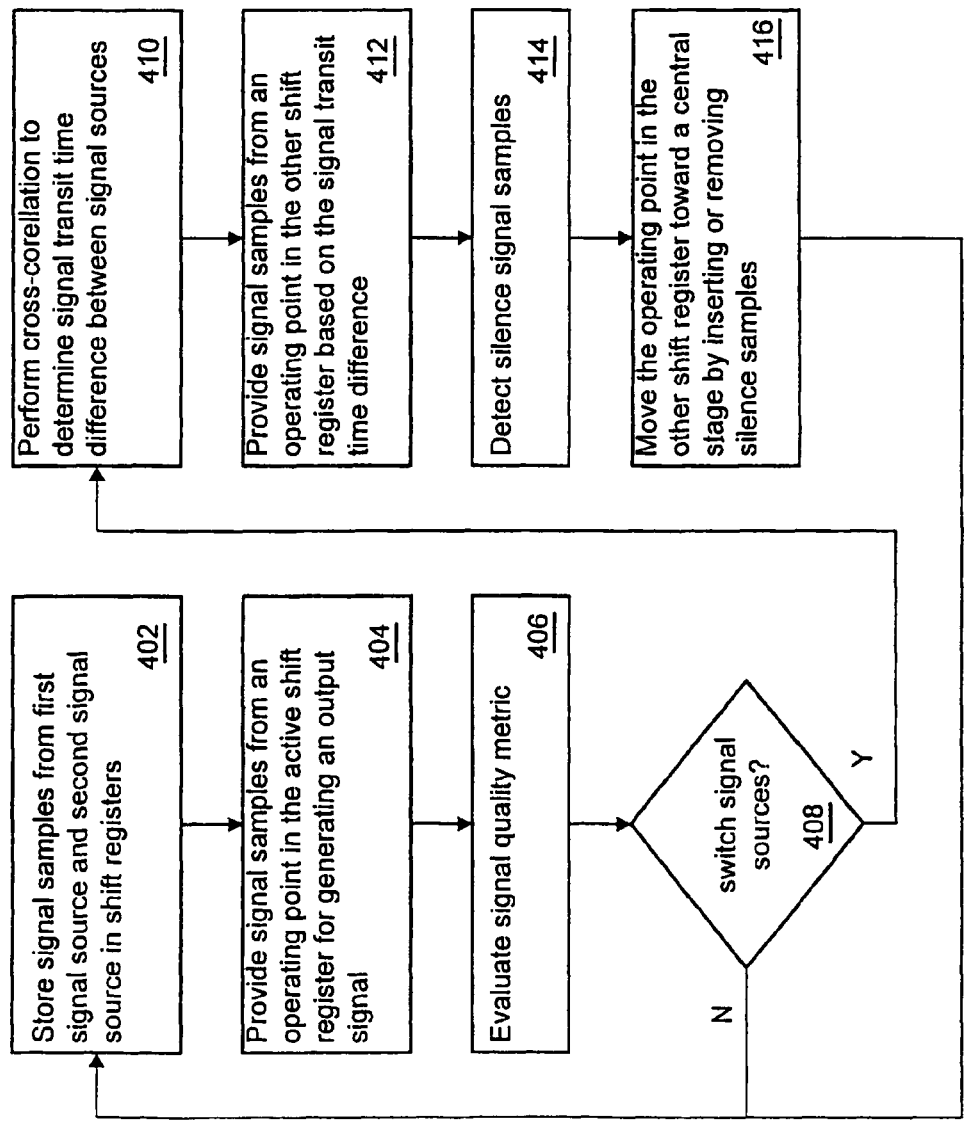
FIG. 4 is a flow chart illustrating a method for minimizing artifacts in an output signal.

FIG. 4 is a flow chart 400 of the steps performed by the front-end 100. For example, the flow diagram 400 may represent the steps that the controller 132 executes, coordinates, or generates control signals for, in accordance with the reception program 138. The shift registers 120, 122 store signal samples obtained from the first and second signal sources (step 402). The first shift register 120, for example, then provides signal samples from the first signal source from an operating point in the first shift register 120 (step 404). Meanwhile, the controller 132 evaluates signal quality metrics on the signal samples to determine which signal source has, as examples, the best signal to noise ratio, the best reception level, the lowest bit error rate, or the like (step 406). In other words, the controller 132 uses one or more metrics to determine whether a better quality signal source is available for a given program of interest (step 406).

If so, the support circuitry performs a cross-correlation to determine a signal transit time difference between the first and second signal sources (step 408). Based on the signal transit time difference, the second shift register 122 provides signal samples from an operating point in the second shift register 122. The controller 132 may then more the operating point toward a central stage in the second shift register 122. To that end, the pause detector 130 may compare for silence samples (step 410), and the controller 132 may insert or remove silence samples in the second shift register 122 (step 412).

While various embodiments of the invention have been described, it will be apparent to those of ordinary skill in the art that many more embodiments and implementations are possible that are within the scope of this invention.

What is claimed is:

1. A method for switching from a first signal source to a second signal source in order to produce an output signal from a communication system, wherein the first signal source produces a first signal, the second signal source produces a second signal, and both the first signal and second signal are received by the communication system, the method comprising:

storing first signal samples obtained from the first signal in a first shift register in a memory section;

storing second signal samples obtained from the second signal in a second shift register in the memory section;

generating the output signal from the first signal samples, wherein the first signal samples are read from the first shift register at a first operating point that is a center stage of the first shift register;

determining whether to switch from the first signal to the second signal for generating the output signal, by evaluating the first signal samples and the second signal samples, wherein the second signal samples are read from the second shift register at a second operating point;

if it is determined that the first signal should be switched to the second signal, then determining a signal transit time difference between the first signal and the second signal;

obtaining a location in the memory section based on the signal transit time difference;

retrieving selected second signal samples from the memory section based on the signal transit time difference and the location in the memory section; and generating the output signal from the retrieved selected second signal samples.

2. The method of claim 1, where the location is an offset in the second shift register that stores the second signal samples.

3. The method of claim 1, where the step of determining the signal transit time difference includes the step of cross-correlating the first signal samples with the second signal samples.

4. The method of claim 1, where the second operating point is offset from the first operating point based on the signal transit time difference.

5. The method of claim 4, further including the step of moving the second operating point to a center stage of the second shift register.

6. The method of claim 5, where the step of moving includes the step of inserting additional second signal samples in the second shift register.

7. The method of claim 6, where the additional second signal samples are silence samples.

8. The method of claim 5, where the step of moving includes the step of removing selected ones of the second signal samples.

9. The method of claim 8, where the selected ones of the second signal samples are silence samples.

10. The method of claim 5, where the step of moving includes the step of discarding silence samples obtained from the second signal without storing the silence samples in the second shift register.

11. The method of claim 1, where the step of determining whether to switch from the first signal to the second signal for generating the output signal is based on a signal quality metric evaluated on the first signal and the second signal.

12. A signal synchronizer for providing signal samples from a first signal source and a second signal source for generating an output signal, comprising:

a memory section storing first signal samples obtained from the first signal source and storing second signal samples obtained from the second signal source, where the memory includes a first shift register for storing the first signal samples, and a second shift register for storing the second signal samples;

evaluating circuitry for determining whether to switch from the first signal source to the second signal source for generating the output signal;

measurement circuitry for determining a signal transit time difference between the first signal source and the second signal source; and a read out controller that determines a memory offset from the signal transit time difference, wherein the memory offset specifies a location in the memory from which to read selected ones of the second signal samples to eliminate at least a portion of signal transit time effects on the output signal and reads from the first shift register at a first operating point, and reads from the second shift register at a second operating point with the second operating point determined from the first operating point and the signal transit time difference.

13. The signal synchronizer of claim 12, where the measurement circuitry is cross-correlation circuitry.

14. The signal synchronizer of claim 12, where the first operating point is a center stage of the first shift register.

15. The signal synchronizer of claim 12, where the readout controller moves the second operating point to a center stage of the second shift register.

16. The signal synchronizer of claim 12, where the readout controller moves the second operating point to a center stage of the second shift register by inserting signal samples in the second shift register.

17. The signal synchronizer of claim 16, where the readout controller inserts silence signal samples.

18. The signal synchronizer of claim 12, where the readout controller moves the second operating point to a center stage of the second shift register by removing signal samples in the second shift register.

19. The signal synchronizer of claim 18, where the readout controller removes silence signal samples.

20. A multi-path signal front-end for switching from a first signal source to a second signal source in order to produce an output signal from the front-end, wherein the first signal source produces a first signal, the second signal source produces a second signal, and both the first signal and second signal are received by the front-end, comprising:

a first antenna input;

a receiver section coupled to the first antenna input and including at least one output for outputting first signal source samples and second signal source samples;

a memory section coupled to the output for storing the first signal source samples and the second signal source samples;

evaluating circuitry for determining whether to switch from the first signal source samples to the second signal source samples for generating the output signal;

measurement circuitry coupled to the memory section for determining a signal transit time difference between the first signal source and the second signal source; and offset circuitry for switching from the first signal source samples to the second signal source samples by determining an offset in the memory section based on the signal transit time difference, wherein the memory offset specifies a location in the memory section to begin reading the second signal samples to eliminate at least a portion of signal transit time effects on the output signal, wherein a first shift register of the memory section supplies the first signal source samples from a first operating point, wherein a second shift register of the memory section supplies the second signal source samples from a second operating point, and wherein the second operating point is determined from the first operating point and the signal transit time difference.

21. The front-end of claim 20, where the receiver section includes a first receiver for outputting the first signal source samples and a second receiver for outputting the second signal source samples.

22. The front-end of claim 21, where the first receiver is a reproduction receiver, and where the second receiver is a search receiver.

23. The front-end of claim 20, further including a second antenna input coupled to the receiver section.

24. The front-end of claim 20, where the measurement circuitry is cross correlation circuitry.

25. The front-end of claim 20, where the memory section includes the first shift register for storing the first signal source samples and the second shift register for storing the second signal source samples.

26. The front-end of claim 20, where the first operating point is a center stage of the first shift register.

27. The front-end of claim 20, where the offset circuitry moves the second operating point to a center stage of the second shift register.

28. The front-end of claim 27, where the offset circuitry moves the second operating point to the center stage of the second shift register by inserting silence signal samples in the second shift register.

29. The front-end of claim 27, where the offset circuitry moves the second operating point to the center stage of the second shift register by removing silence signal samples in the second shift register.

30. A non-transitory computer readable medium storing a plurality of instructions that when executed by a processor performs a method for switching from a first signal source to a second signal source in order to produce an output signal from a communication system, wherein the first signal source produces a first signal, the second signal source produces a second signal, and both the first signal and second signal are received by the communication system, the method of the computer readable medium comprising:

storing first signal samples obtained from the first signal in a first shift register in a memory section;

storing second signal samples obtained from the second signal in a second shift register in the memory section;

generating the output signal from the first signal samples, wherein the first signal samples are read from the first shift register at a first operating point that is a center stage of the first shift register;

determining whether to switch from the first signal to the second signal for generating the output signal, by evaluating the first signal samples and the second signal samples, wherein the second signal samples are read from the second shift register at a second operating point;

determining a signal transit time difference between the first signal and the second signal based on the first and second signal samples, if it is determined that the first signal should be switched to the second signal;

retrieving selected second signal samples based on the signal transit time difference, wherein the storing the second signal samples includes storing the second signal samples in a memory section, and obtaining a location in the memory section based on the signal transit time difference, and wherein the retrieving includes reading the selected second signal samples from the memory section based on the location; and generating the output signal from the retrieved selected second signal samples.

31. The computer readable medium of claim 30, where the step of determining the signal transit time difference includes cross-correlating the first signal samples with the second signal samples.

32. The computer readable medium of claim 30, where the second operating point is offset from the operating point based on the signal transit time difference.

33. The computer readable medium of claim 32, further including moving the second operating point to a center stage of the second shift register.

34. The computer readable medium of claim 33, where the step of moving includes inserting additional second signal samples in the second shift register.

35. The computer readable medium of claim 34, where the additional second signal samples are silence samples.

36. The computer readable medium of claim 34, where the step of moving includes removing selected ones of the second signal samples.

37. The computer readable medium of claim 36, where the selected ones of the second signal samples are silence samples.

38. The computer readable medium of claim 30, where determining whether to switch from the first signal to the second signal for generating the output signal are based on a signal quality metric evaluated on the first signal and the second signal.

* * * * *

UNITED STATES PATENT AND TRADEMARK OFFICE
CERTIFICATE OF CORRECTION

PATENT NO. : 7,738,609 B2  
APPLICATION NO. : 11/063713  
DATED : June 15, 2010  
INVENTOR(S) : Gierl et al.

It is certified that error appears in the above-identified patent and that said Letters Patent is hereby corrected as shown below:

At column 2, line 41, change "minimizes" to --minimize--  
At column 2, line 62, change "the first receiver 116 and the second receiver 118" to --the first receiver 118 and the second receiver 116--  
At column 3, line 14, insert --116,118-- after "The receivers"  
At column 3, line 17, change "the first receiver 116" to --the first receiver 118--  
At column 3, line 19, change "the second receiver 118" to --the second receiver 116--  
At column 3, line 35, change "for use wit" to --for use with--  
At column 3, line 41, insert --120,122-- after "the memories"  
At column 3, line 59, insert --116,118-- after "the receivers"  
At column 4, line 7, insert --132-- after "the controller"  
At column 4, line 36, change "the first receiver 116" to --the first receiver 118--  
At column 4, line 37, change "the second receiver 118" to --the second receiver 116--  
At column 4, lines 53-54, insert --120-- after "the first shift register"  
At column 5, line 37, insert --122-- after "the second shift register"  
At column 5, line 59, insert --120,122-- after "the shift registers"  
At column 6, line 50, change "more" to --move--  
In Claim 32, column 10, line 24, change "the operating point" to --the first operating point--

Signed and Sealed this

Seventh Day of December, 2010

David J. Kappos  
*Director of the United States Patent and Trademark Office*